United States Patent
Bonhoure et al.

(10) Patent No.: US 6,349,258 B1
(45) Date of Patent: Feb. 19, 2002

(54) METHOD FOR HORIZONTAL ROUTING OF AN AIRCRAFT BETWEEN TWO WAYPOINTS

(75) Inventors: Fabienne Bonhoure, Velizy; Fabien Inglese, Issy les Moulineaux, both of (FR)

(73) Assignee: Thomson CSF-Sextant, Velizy Villacoublay (FR)

( * ) Notice: Subject to any disclaimer, the term of this patent is extended or adjusted under 35 U.S.C. 154(b) by 0 days.

(21) Appl. No.: 09/622,046
(22) PCT Filed: Dec. 17, 1999
(86) PCT No.: PCT/FR99/03188
§ 371 Date: Aug. 23, 2000
§ 102(e) Date: Aug. 23, 2000
(87) PCT Pub. No.: WO00/39650
PCT Pub. Date: Jul. 6, 2000

(30) Foreign Application Priority Data

Dec. 23, 1998 (FR) ............................................ 98 16354

(51) Int. Cl.$^7$ ............................................ G06F 165/00
(52) U.S. Cl. ............................ 701/206; 701/3; 701/12; 701/210; 701/226; 244/158 R
(58) Field of Search ........................... 701/3, 6, 11, 12, 701/206, 210, 218, 226; 244/75 R, 158 R

(56) References Cited

U.S. PATENT DOCUMENTS

| | | | |
|---|---|---|---|
| 4,589,616 A | * 5/1986 | Zweifel | 244/180 |
| 4,668,954 A | * 5/1987 | Tomasi | 342/387 |
| 4,679,047 A | * 7/1987 | Tomasi | 342/52 |
| 5,646,854 A | 7/1997 | Bevan | |
| 5,774,818 A | 6/1998 | Pages | |
| 5,922,031 A | * 7/1999 | Larrieu | 701/3 |

FOREIGN PATENT DOCUMENTS

| EP | 0 762 252 | 3/1997 |
|---|---|---|
| FR | 2 749 686 | 12/1997 |

* cited by examiner

*Primary Examiner*—Gertrude Arthur
(74) *Attorney, Agent, or Firm*—Oblon, Spivak, McClelland, Maier & Neustadt, P.C.

(57) ABSTRACT

This method meets the constraints dictated by the instructed values of turning radius and by the instructed values of direction of approach in terms of route or course to be maintained at the obligatory points of passage. It includes, at the obligatory starting and arrival points of passage, in determining the turning paths that meet the instructed turning radius at these points. These turning paths are located, at each of the obligatory points of passage, on a pair of circles that are tangential to the points of passage, according to the instructed direction of approach valid at this point and oriented in this direction. Once these turning paths have been determined, a selection is made, from among them, according to simple rules, of an initial homing turning path and a final capture path that can be connected by a rectilinear linking path to go from the obligatory starting point of passage to the obligatory arrival point of passage while seeking the shortest possible distance of travel. This method is advantageous because it requires only low computation capacity and can be implemented by the flight management systems with which the present generation of aircraft are fitted out. It also provides for the precise and constantly updated pre-setting of the route followed by the aircraft during a mission, taking account of the obligatory points of passage, and hence for precise estimates of the scheduling of the mission and of the quantity of fuel needed for the mission.

17 Claims, 2 Drawing Sheets

WITH:
∈ : IS LOCATED IN
∩ : INTERCEPTS
⌀ : DOES NOT INTERCEPT
< : IS UPLINE FROM

METHOD FOR HORIZONTAL ROUTING OF AN AIRCRAFT BETWEEN TWO WAYPOINTS

This application is a 371 of PCT/FR99/03188 filed Dec. 17, 1999.

BACKGROUND OF THE INVENTION

1. Field of the Invention

The present invention relates to the determining of a horizontal path that an aircraft has to follow when going from one obligatory point of passage to another, in keeping with the constraints dictated by the instructions for the turning radius and the instructions for the direction of approach in terms of route or course to be maintained at the obligatory points of passage.

2. Discussion of the Background

Hitherto, the horizontal path to be followed during a mission has been constructed on the basis of a broken line passing through obligatory points of passage, with turning portions between the rectilinear path segments travelled in a constant route or course. This broken line is not chosen haphazardly but on the basis of standard criteria of optimization of the length of the trace on the ground and the maneuvering possibilities of the aircraft. At present, this choice and therefore the construction of the horizontal path to be followed during a mission require major computation means that are as yet not available on aircraft. The horizontal path to be followed is therefore computed by means located on the ground when a mission is being prepared.

Once defined on the ground, all the information and characteristics pertaining to the mission, namely the sequence of rectilinear segments and turning portions that constitute the mission as well as the instructed speeds dictated for traveling in each of the rectilinear segments and turning portions, are put into shape so that they can be used by the flight management system of the aircraft. A rectilinear segment is defined by the geographical coordinates of its extremities and possibly by a direction of orientation in route or course while the turning portions are defined by a center and a radius of curvature.

To track the horizontal instructed path, the flight management system of an aircraft constantly compares the true geographic position of the aircraft, as it appears from the localizing measurements obtained through the processing of the information from the inertial guidance unit and/or localizing instruments such as satellite localizing systems or the like, with the geographical position that it is supposed to have on the instructed horizontal path. From these comparisons, it deduces a lateral divergence and a route divergence and, by means of a table of equivalence with two inputs, lateral deviation and route deviation, it converts these two deviations into commands applied to the rudders by means of the flight control system of the aircraft.

This method has drawbacks, inasmuch as during a mission it is not unusual for an aircraft to have to modify its flight plan following unexpected events, for example malfunctioning or the appearance of a danger zone on the path being followed. The new path to be followed, which is different from the one initially planned, has neither been prepared beforehand nor put into shape for processing by the flight management system of the aircraft which then cannot be used. The pilot must therefore resume control of the flight commands and himself follow a new path that resolves the problem resulting from the appearance of the event.

To release the pilot from the piloting task, even in unexpected situations, it has already been proposed to equip aircraft with an additional computer capable of suggesting new paths with which to resolve the problem raised. However, such equipment proves to be very costly and does not entirely meet the pilot's needs because it requires a major response time that is often incompatible with the reaction times that an aircraft pilot must have. Furthermore, the paths proposed are often ill-suited to the problem that has arisen. They, lack precision and cannot be directly performed by the flight management system. The pilot himself has to take over the flight controls and follow the instructions given to him on the proposed path.

Furthermore, resuming the normal route of the mission implies that the pilot should return to the initially planned instructed path without the help of the flight management system which is capable of making automatic corrections of only small positional deviations.

The modifications that are made during a mission, when there is an unplanned change in route, can vary to a great extent in one and the same situation as they are left entirely to a pilot's initiative and do not take a form that can be directly exploited by the aircraft navigation system. These modifications adversely affect the planning precision of the mission because they cause advances or delays which are difficult for the pilot to assess with precision. The pilot can then only compensate for them imperfectly. Furthermore, the high possibility of unplanned modifications in the path followed during a mission means that it is necessary to allow for a substantial safety margin in terms of the quantity of fuel taken on board. This will be done to the detriment of the carrying capacity of the aircraft.

SUMMARY OF THE INVENTION

It is the aim of the present invention to overcome these drawbacks.

The invention is also designed to facilitate the pilot's task by releasing him from the problems of navigation related to unexpected changes in route and by transferring these responsibilities to the flight management system of the aircraft. To this end, there is proposed a routing system, undemanding in terms of computation capacity, that can be executed by the flight management system of the aircraft whenever there is a change in route to update the path to be followed and immediately integrate the modifications made in the path into the flight plan so that the navigation system can take account thereof in real time and maintain the scheduling precision of the mission by itself, after homing in on the instructed path, by playing on the speed of the aircraft in the period that precedes this homing in.

An object of the invention is a method for the horizontal routing of an aircraft between two obligatory points of passage in keeping with the constraints dictated by the instructed values of turning radius and by the instructed values of route or course orientation to be followed at the obligatory points of passage.

According to the invention, this method consists in:
  determining, at the obligatory starting point of passage, called the initial point, the turning paths that meet the instructed value of turning radius at this initial point, these turning paths being located on two circles known as homing circles, tangential to the initial point along the direction of the instructed value of orientation in route or course at this initial point, known as the directional sense of the initial route, and oriented along this direction therefore with reverse directional senses of travel,
  determining, at the obligatory arrival point of passage, called a final point, the turning paths that meet the instructed value of turning radius at this final point, these turning paths being located on two circles, called capture circles, tangential to the final point along the direction of the instructed value of orientation in final route or course, called the directional sense of the final route, and oriented along this direction, therefore with two reverse directional senses of travel, and defining a path comprising three portions:

a first portion consisting of an initial circular turn for homing in on the general direction of the final point, begun in starting from the initial point with the direction of the instructed value of orientation of an initial route and followed in describing a part of the contour of one of the homing circles in following its directional sense of travel, a second portion consisting of a constant-route homing straight line along a tangent to the homing circle selected for the initial circular turn and to one of the capture circles, said tangent being oriented towards the final point and in the directional sense of each of the circles at the points of tangency, and a third portion consisting of a final capture circular turn following the contour of the capture circle reached at the end of the homing straight line in keeping to its directional sense of travel, until the final point reached with the direction of the instructed value of orientation of final route, the homing and capture circles followed during the homing and capture circular turns being selected so as to minimize the distance of travel, and making the aircraft follow the path thus defined.

Through these arrangements, the desired path is obtained with a minimum number of computations, given all the possible situations of positions of initial and final points and route points. This method furthermore makes it possible to select the shortest path before computing it. The result thereof is that this method can easily be applied to the determining of the path in real time. The path thus computed is obtained by taking account of the maneuvering possibilities of the aircraft. It therefore enables the precise overflight of the initial and final points with the planned courses.

Generally, automatic piloting devices are designed to perform straight line phases and constant radius turns, the path obtained by this method being therefore quite suitable for being fed into a device of this kind.

According to one particular feature of the invention, the method applies the convention according to which the first capture circle is the one located on the same side of the final route going through the final point as the initial point and the first rallying circle is the one which has the same directional sense of travel as the first capture circle. Through these conventions, the capture circle C1 will be selected in most cases.

The method includes the selection of the first homing circle if the initial point is in the first capture circle and the selection of the first capture circle if the first homing circle does not intercept the final route passing through the final point or intercepts the second capture circle, and the selection of the second capture circle if the first homing circle intercepts the final route but not the second capture circle.

The method according to the invention thus makes it possible to meet the conditions of route and point of passage even if the final route is very close to the initial point, given the maneuvering possibilities of the aircraft.

It must be noted that, in this case, the homing and capture circles are selected by making use of simple geometrical computations that cost little in computation time.

According to another particular feature of the invention, the method includes the a priori selection of the first capture circle if the initial point is not in the first capture circle.

According to another particular feature of the invention, the method includes the selection of the first homing circle and the first capture circle if the following condition is met:

the initial point is not in the first capture circle, and the second homing circle intercepts the first capture circle.

Should the initial point not be in the first capture circle and should the second homing circle not intercept the first capture circle, the homing circle is selected as a function of the initial route and of the route directed along the tangent to the first capture circle, going through the initial point.

According to another particular feature of the invention, if the following condition is fulfilled:

the initial point is upline with respect to the final point and outside the first capture circle, and the first homing circle intercepts the final route but not the second capture circle, the method comprises the selection of the first homing circle and the second capture circle or of the second homing circle and the first capture circle.

In this case, one combination or the other is selected depending on whether the first capture circle has been previously selected or not.

In this way, using tests that cost little in terms of computation capacity, the method according to the invention is used to select the homing circle and the capture circle to be used to determine the desired path. It furthermore makes it possible to limit the cases where costlier computations of tangents have to be performed.

BRIEF DESCRIPTION OF THE DRAWINGS

An embodiment of the method according to the invention shall be described hereinafter, by way of a non-restricted example, with reference to the appended drawings, of which.

DESCRIPTION OF THE PREFERRED EMBODIMENTS

Figure 1:
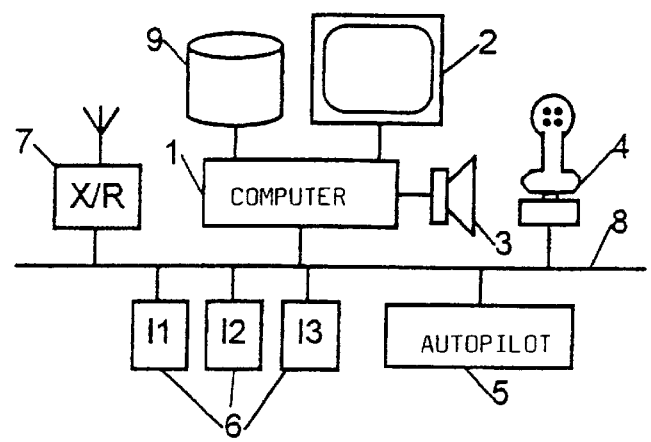
FIG. 1 gives a schematic view of the electronic equipment, fitted on board an aircraft and used to implement the method according to the invention.

The method according to the invention is particularly well suited for implementation by electronic equipment on board an aircraft. As shown in FIG. 1, this equipment includes a computer 1 connected to one or more display screens 2, a mass memory 9. This computer 1 is connected for example by the data transmission network 8, the bus of the aircraft, to the on-board flight sensors and instruments 6, the piloting controls 4, an automatic pilot device 5 and a digital data transmission device 7 for example of the "data link" type. In this way, the computer 1 can make real time acquisitions of data coming from other on-board electronic equipment, namely especially the geographical position of the aircraft, its altitude, its speed and its state.

The automatic pilot device has a memory in which the path in progress, followed by the aircraft, is recorded. This path consists of a succession of straight line segments between a starting point and a destination point. These segments are connected by arcs of circles.

The mass memory 9 has the characteristics of the aircraft and especially the data defining its possibilities of maneuvering such as the minimum turning radius as a function of speed as well as all the data on the mission. The minimum turning radius can also be given by the maximum load factor accepted by the pilot in automatic pilot mode.

The mission data includes especially:

map data used by the computer 1 for the display, on the screen 2, of the image of a geographical map of the zone being flown over during the mission, navigation data, for example the geographical position and the characteristics of the radio beacons and airports accessible by the aircraft during the mission, data on the planned path enabling the computer to display this path in an overlay on the screen on the image of the map, the position and size of danger zones, if any, to be avoided, and the expected weather conditions during the mission in the zone flown over.

The data on the planned path include the position of the required points of passage associated with a pre-appointed time and an overflying altitude.

Figure 2:
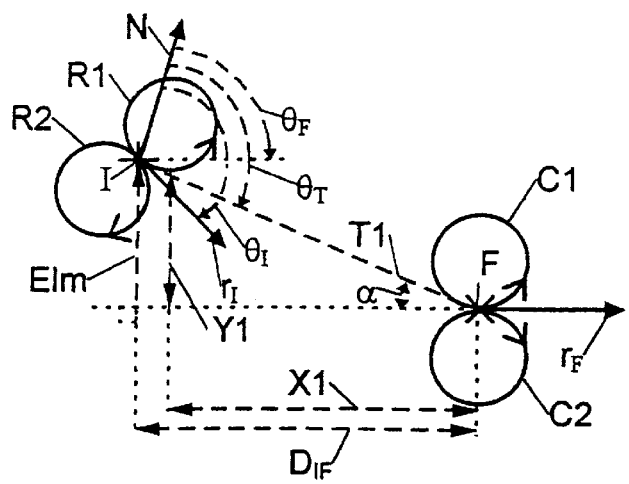
FIG. 2 shows two stops or obligatory points of passage on route, between which the method of the invention determines a path.

All the data may be modified at any time; either directly by the pilot or the on-board sensors and instruments or by information received by radio links. It will therefore seem to be desirable to determine a path in real time. This determination can be reduced to a succession of computations of path segments demarcated by an initial point I and a final point F respectively associated with an initial route $r_I$ and a final route $r_F$. The initial route $r_I$ and the final route $r_F$ are oriented axes passing respectively through the points I and F and forming an initial route angle $\theta_I$ and a final route angle $\theta_F$ identified with respect to the direction of the north N between $-180°$ and $+180°$, these angles increasing in the clockwise sense (FIG. 2).

According to the invention, the initial point I is associated with two homing circles R1 and R2 that are tangential at I to the initial route $r_I$ and have a radius $r_R$ corresponding to the envisaged homing turning radius of the aircraft. Similarly, the final point F is associated with two capture circles C1 and C2 tangential at F to the final route $r_F$ and having a radius $r_C$ corresponding to the envisaged capture turning radius of the aircraft. Each capture circle or homing circle is associated with a directional sense of travel determined by the respective directional senses of the initial route $r_I$ and the final route $r_F$.

Furthermore, the invention applies the convention according to which the first capture circle C1 is placed on the same side of the final route $r_F$ passing through the final point F as the initial point I, so that the circle C1 will be the preferred capture circle. The first homing circle R1 is the one travelled through in the same directional sense as the first capture circle C1, given the respective directional senses of $r_I$ and $r_F$.

FIGS. 3a to 3i show different exemplary configurations of the points I and F and the routes $r_I$ and $r_F$. In these figures, the homing circles R1, R2 and capture circles C1, C2 are shown in dashes while the path that is chosen and computed is shown in a solid line.

Figure 4:
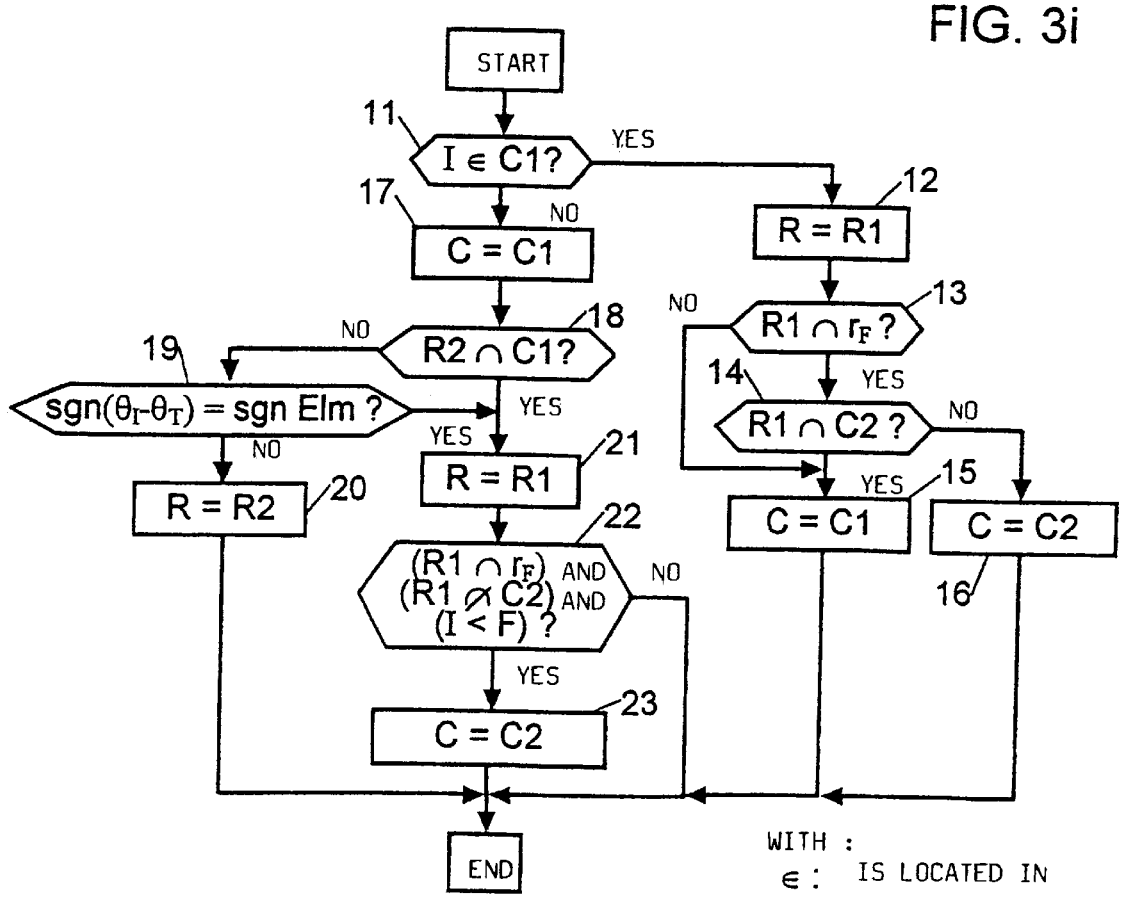
FIG. 4 gives a view in the form of a flow chart of the different steps of the method according to the invention.

In FIG. 4, which shows the different steps of the method according to the invention performed by the computer 1, the first step 11 determines whether the initial point I is in the capture circle C1 or not.

To this end, the distance $\Delta$ between the initial point and the point of tangency at the circle C1 of the tangent T1 to this circle passing through the point I is calculated by means of the following equation:

$$\Delta^2 = (ELM - sgn(ELM) \cdot r_c)^2 + D_{IF}^2 - r_c^2 \qquad (1)$$

wherein:

Elm is the metric lateral deviation or the signed distance between the initial point I and the oriented axis $r_F$ passing through the final point F and having the direction of the final route $r_F$, Elm being chosen to be positive when it is located to the left of the axis $r_F$, $sgn(Elm)=1$ when $Elm \geq 0$, and, if not, $sgn(Elm)=-1$, $D_{IF}$ is the distance between the point I and the point F projected on the final route $r_F$, and $r_C$ is the radius of the capture circles.

If $\Delta^2$ is negative, it means that the point I is within the capture circle C1. In this case, the circle R1 is chosen as the homing circle (step 12). The capture circle is then determined according to whether the homing circle R1 intercepts or does not intercept the final route $r_F$ passing through the point F (step 13), and intercepts or does not intercept the capture circle C2 (step 14).

The condition of the step 13 is verified by computing the following quantity:

$$Y1 = |Elm| - r_R \cdot (1 - \cos(\theta_I - \theta_F)) \qquad (2)$$

wherein $r_R$ is the radius of the homing circles R1, R2 and $|Elm|$ is the absolute value of the signed distance Elm.

The condition of the step 14 is verified by computing the distance L1 between the centers of the circles R1 and C2 by the following formulae:

$$X1 = D_{IF} - sgn(Elm) \cdot r_R \cdot \sin(\theta_I - \theta_F) \qquad (3)$$

$$L1^2 = X1^2 + (Y1 + r_R + r_C)^2 \qquad (4)$$

If the circle R1 does not intercept the final route $r_F$, namely $Y1 \geq 0$ or intercepts the circle C2 (hence also the final route $r_F$), namely $L1^2 \leq (r_R + r_C)^2$, the chosen capture circle is the circle C1 (step 15). If not, namely if the circle R1 intercepts the final route $r_F$ ($Y1<0$), but not the circle C2 ($L1^2 > (r_R + r_C)^2$), the chosen capture circle is the circle C2 (step 16).

Figure 3A:
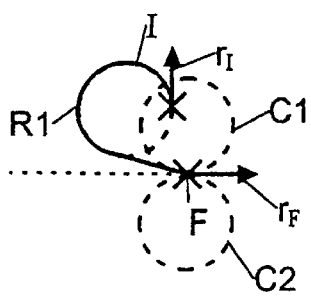
FIGS. 3a to 3i illustrate different examples of respective positions of initial and final goals and initial and final directions of routes taken into account by the method according to the invention.
Figure 3B:
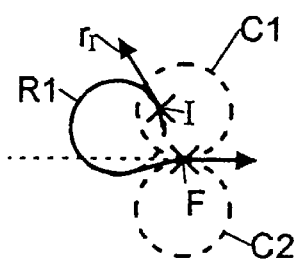
Figure 3C:
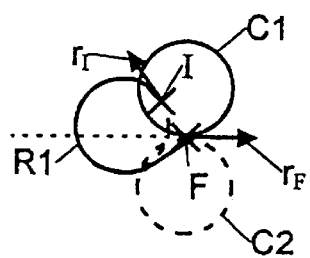

These three cases are respectively illustrated by FIGS. 3a to 3c wherein the paths to be computed comprise arcs of circles belonging to the first homing circle R1 and respectively to the capture circle C1 (the cases of FIGS. 3a and 3c) or C2 (the case of FIG. 3b) as well as a path segment with a constant route tangential to the homing circle R1 and to the capture circle C1 or C2 selected.

In the second arm of the flow chart shown in FIG. 4, corresponding to the case where the initial point I is not in the first capture circle C1 ($\Delta^2 > 0$), the circle C1 is chosen a priori as a capture circle (step 17). In the step 18, it is ascertained that the second homing circle R2 intercepts or does not intercept the first capture circle C1. To this end, the following values are computed:

$$X2 = D_{IF} + sgn(Elm) \cdot r_R \cdot \sin(\theta_I - \theta_F)$$

$$Y2 = |Elm| - sgn(Elm) \cdot r_R \cdot (1 + \cos(\theta_I - \theta_F))$$

$$L2^2 = X2^2 + (Y2 + sgn(Elm) \cdot (r_R + r_C)^2$$

If the circle R2 intercepts the circle C1 ($L2^2 \leq (r_R + r_C)^2$), the first homing circle R1 (step 21) is chosen. This case is illustrated for example in FIG. 3g.

If not, $(L2^2>(r_R+R_C)^2)$, an examination is made in the step 19 of the sign of the difference $(\theta_I-\theta_T)$, brought between −180° and +180°, between the initial route $\theta_I$ and the angle $\theta_T$ of the route that is tangential T1 to the circle C1 passing through the initial point I.

To this end, the route angle $\theta_T$ is obtained as a function of the final route angle $\theta_F$ by the following equations:

$$\sin\alpha = \frac{Elm - sgn(Elm)\cdot r_C\cdot (1-\cos\alpha)}{\Delta}$$

$$\cos\alpha = \frac{D_{IF} - sgn(Elm)\cdot r_C\cdot \sin\alpha}{\Delta}$$

with $\alpha=\theta_T-\theta_F$.

The result thereof is:

$$\alpha = a\tan\left(\frac{r_C\cdot D_{IF} + \cdot sgn(Elm)\cdot (Elm-sgn(Elm)\cdot r_C)}{\Delta\cdot sgn(Elm)\cdot D_{IF} - r_C\cdot (Elm-sgn(Elm)\cdot r_C)}\right)$$

atan being the arctangent function and the angle α being computed between −180° and +180° in taking account of the respective signs of sin α and cos α.

Figure 3D:
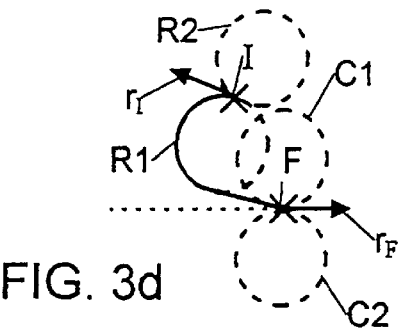
Figure 3E:
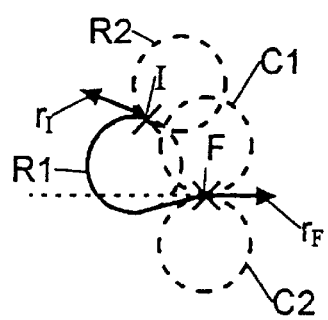
Figure 3F:
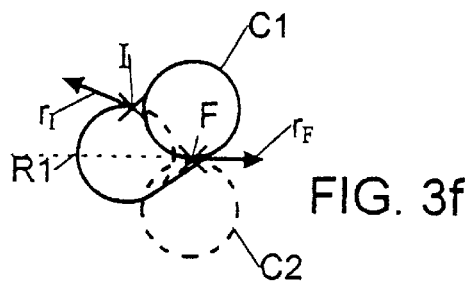
Figure 3G:
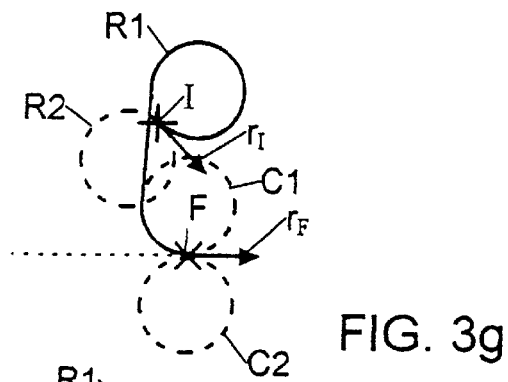
Figure 3H:
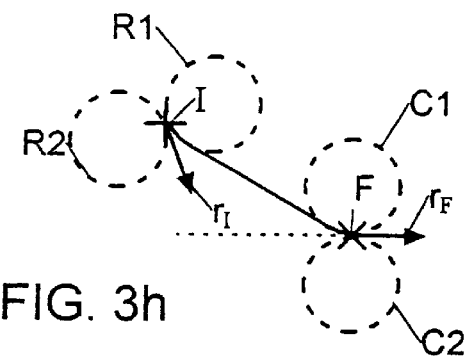
Figure 3I:
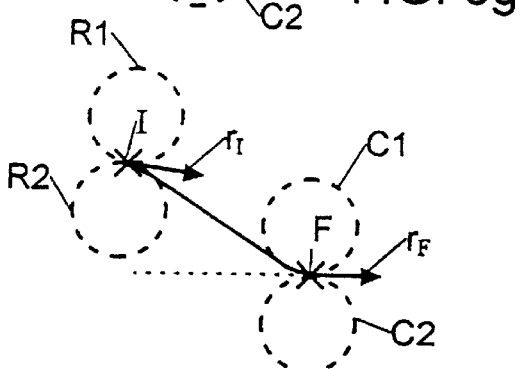

If the route deviation $(\theta_I-\theta_T)$ has the same sign as Elm, which corresponds for example to the cases illustrated by FIGS. 3d and 3h, the homing circle R1 (step 21) is chosen. If not, it is the circle R2 that is chosen (step 20) as shown in FIG. 3i.

The processing done in the steps 19 to 21 amounts to selecting the homing circle that corresponds to a left-hand turn if the route deviation $\theta_I-\theta_T$ is positive and the homing circle that corresponds to a right-hand turn if this route deviation is negative. If this route deviation is zero, which means that the tangent route angle $\theta_T$ corresponds to the initial route angle $\theta_I$, then the planned path does not include the initial homing turn.

Should the homing circle R1 have been chosen and should this circle intercept the route $r_F$ but not the circle C2, and should the initial point I be upline with respect to the final point F, given the sense of the final route $r_F$ (step 22), the choice of the capture circle C1 is reviewed and the circle C2 (step 23) is selected as illustrated in FIG. 3e.

Once the homing and capture turn circles are determined, the method makes use of conventional and simple computations to determine points of tangency of the tangent to two oriented circles to finally obtain a path that can be executed by an automatic pilot device.

In the above description, the method according to the invention makes use of only one arctangent computation which is costly in terms of computation capacity, and does only when the initial point I is not in the capture circle C1 and when the homing circle R2 does not intercept it. This method therefore makes it possible to reduce the cases when the arctangent function has to be used.

What is claimed is:

1. Method for routing an aircraft between an initial point and a final point, comprising the steps of:
   determining initial turning paths that meet an instructed value of turning radius at said initial point, said initial turning paths being located on two homing circles tangential at the initial point to a direction of an initial route, said homing circles having opposite directional senses of travel,
   determining final turning paths that meet an instructed value of turning radius at said final point, said final turning paths being located on two capture circles tangential at the final point to a direction of a final route, said capture circles having opposite directional senses of travel,
   selecting one of the homing circles and one of the capture circles, and
   defining a travel path comprising three portions:
      a first portion including a portion of said initial turning paths starting from the initial point and following a part of a contour of said one of the homing circles,
      a second portion including a homing straight line along a tangent to said one of the homing circles and to said one of the capture circles, said tangent being oriented towards the final point and in a directional sense of each of the said one of homing and capture circles at points of tangency, and
      a third portion including a portion of said final turning paths following a part of a contour of said one of the capture circles from an end of the homing straight line until the final point, said one of the homing and capture circles being selected so as to minimize said travel path, and
   making the aircraft follow the travel path.

2. Method according to claim 1, further comprising the step of applying a convention wherein a first capture circle is located on a same side of the final route going through the final point as the initial point, and a first homing circle has a same directional sense of travel as the first capture circle.

3. Method according to claim 2, wherein the step of selecting said one of the homing and capture circles comprises:
   selecting the first homing circle if the initial point is in the first capture circle,
   selecting the first capture circle if the first homing circle does not intercept the final route passing through the final point, or intercepts a second capture circle, and
   selecting the second capture circle if the first homing circle intercepts the final route but not the second capture circle.

4. Method according to claim 2, further comprising the step of selecting the first capture circle if the initial point is not in the first capture circle.

5. Method according to claim 2, further comprising selecting the first homing circle and the first capture circle if:
   the initial point is not in the first capture circle, and
   a second homing circle intercepts the first capture circle.

6. Method according to claim 2, further comprising, if the initial point is not in the first capture circle and if a second homing circle does not intercept the first capture circle, selecting said one of the homing circles as a function of the initial route and of a route tangential to the first capture circle, going through the initial point.

7. Method according to claim 6, further comprising determining a sign of a route deviation between the route tangential to the first capture circle passing through the initial point and the initial route, and
   if said route deviation is positive, further comprising selecting a homing circle corresponding to a left-hand turn,
   if said route deviation is negative, further comprising selecting a homing circle corresponding to a right-hand turn, and
   if said route deviation is zero, making said first portion of said travel path equal to zero.

8. Method according to claim 2, wherein if:
   the initial point is upline with respect to the final point, outside the first capture circle, and the first homing circle intercepts the final route but not a second capture circle, the method comprises one of the steps of:

selecting the first homing circle and the second capture circle, and selecting a second homing circle and the first capture circle.

9. Method according to claim 8, wherein:

if the first homing circle has been previously selected, the method further comprises selecting the second capture circle, and if the first homing circle has not been selected, the method further comprises selecting the second homing circle and the first capture circle.

10. A method of routing a vehicle from an initial point to a final point, said vehicle moving in an initial direction at said initial point and in a final direction at said final point, the method comprising the steps of:

determining an initial turning path on a homing circle tangential to said initial direction at said initial point, said initial turning path starting at said initial point and ending at an initial turning path endpoint, determining a final turning path on a capture circle tangential to said final direction at said final point, said final turning path starting at a final turning path startpoint and ending at said final point, and determining a straight path from said initial turning path endpoint to said final turning path startpoint, said straight path being tangential to said homing circle and tangential to said capture circle.

11. The method of claim 10, wherein said homing circle has a radius equal to a turning radius of said vehicle at said initial point, and said capture circle has a radius equal to a turning radius of said vehicle at said final point.

12. The method of claim 10, further comprising selecting said homing and said capture circles so as to minimize the sum of said initial turning path, said final turning path and said straight path.

13. The method of claim 10, further comprising adopting a convention to identify a reference circle.

14. The method of claim 13, further comprising selecting said homing circle based on a position of said initial point relative to said reference circle.

15. The method of claim 14, further comprising selecting said capture circle based on whether said capture circle intercepts said homing circle.

16. The method of claim 13, further comprising selecting said capture circle based on a position of said initial point relative to said reference circle.

17. The method of claim 16, further comprising selecting said homing circle based on whether said capture circle intercepts said homing circle.

* * * * *